United States Patent
Tercho

(10) Patent No.: US 7,803,314 B1
(45) Date of Patent: Sep. 28, 2010

(54) NON-TOXIC SHOT FORMULATION AND METHOD OF MAKING

(76) Inventor: Daniel George Tercho, 9970 Berney Rd., Albion, PA (US) 16401

(*) Notice: Subject to any disclaimer, the term of this patent is extended or adjusted under 35 U.S.C. 154(b) by 1111 days.

(21) Appl. No.: 10/741,049

(22) Filed: Dec. 18, 2003

(51) Int. Cl.
*C22C 13/00* (2006.01)
*C22C 27/04* (2006.01)

(52) U.S. Cl. .................. 420/557; 420/430; 420/589; 419/39; 102/448; 102/517

(58) Field of Classification Search .................. None
See application file for complete search history.

(56) References Cited

U.S. PATENT DOCUMENTS

| | | | |
|---|---|---|---|
| 5,399,187 A * | 3/1995 | Mravic et al. ................. | 75/228 |
| 6,517,774 B1 * | 2/2003 | Bray et al. .................... | 419/65 |
| 6,536,352 B1 * | 3/2003 | Nadkarni et al. ............. | 102/506 |
| 6,551,375 B2 * | 4/2003 | Siddle et al. .................. | 75/248 |
| 7,059,233 B2 * | 6/2006 | Amick ........................... | 86/54 |
| 2001/0053331 A1 * | 12/2001 | Le Floc'h et al. ............. | 419/67 |
| 2002/0124759 A1 * | 9/2002 | Amick ........................... | 102/439 |
| 2003/0056620 A1 * | 3/2003 | Siddle et al. .................. | 75/248 |
| 2004/0216589 A1 * | 11/2004 | Amick ........................... | 86/54 |
| 2005/0016411 A1 * | 1/2005 | Amick ........................... | 102/501 |
| 2005/0066850 A1 * | 3/2005 | Leblanc et al. ............... | 102/517 |

FOREIGN PATENT DOCUMENTS

WO   WO 03/033751 A1 *   4/2003

OTHER PUBLICATIONS

ASM Handbook, vol. 7, Powder Metallurgy, 1984, pp. 190-193.*
Chemical Engineers' Handbook, 1973, p. 21-41.*

* cited by examiner

*Primary Examiner*—John P Sheehan
(74) *Attorney, Agent, or Firm*—Richard K Thomson

(57) ABSTRACT

Non-toxic shot having 40-60% tungsten, 20-60% tin and 0-10% iron. A process of formulating the material is disclosed in which 95% by weight of the particles of each component having mesh sizes less than 325 are blended with a flux having 99.9% by weight particles less than 100 mesh. The blended material is then compaction formed into shape at a pressure range of between 20 and 40 tons per square inch. Finally, the blended material is sintered at a temperature in the range of 350 and 425° F. bonding the powdered metals and driving off the flux.

4 Claims, No Drawings

NON-TOXIC SHOT FORMULATION AND METHOD OF MAKING

BACKGROUND AND SUMMARY OF THE INVENTION

The present invention is directed to environmentally friendly shot for use in hunting and fishing. More particularly, the present invention is directed to a lead-free shot which avoids toxicity inherent in such mixtures.

Environmental concerns regarding the effects of lead, on humans and wildlife, have led to creation of a number of formulations used in formulating shot for shot gun shells and fishing weights which are non-toxic, i.e., which do not contain lead or other potentially harmful ingredients.

The present invention is directed to a non-toxic shot for use with fish and game, said non-toxic shot consisting essentially of 20-60% by weight tin; 40-60% by weight tungsten; and 0-10% by weight iron. Iron is added as a convenience for the Wildlife Commission, since leaded shot will be non-magnetic. The presence of iron will magnetize the shot and make it easily identifiable as a non-toxic formulation. The resulting shot formulation has a density which mimics that of conventional lead shot so the resulting pellets behave in a similar manner.

Another aspect of the present invention is a method of manufacturing the formulation used in making this non-toxic shot comprising the steps of a) combining powdered tin, powdered tungsten and powdered iron, 95% of all metallic particles having a particle size less than 325 mesh; powdered flux with in which 99.9% of the particles are less than 100 mesh; b) compaction forming the shot from the powdered metal mixture at 20-40 tons per square inch pressure; and, c) sintering the formed shot at a temperature in the range of 350 and 425° F. driving off the flux and enhancing bonding of the metallic components.

Various other features, advantages and characteristics of the present invention will become apparent to one of ordinary skill in the art after a reading of the following specification.

DETAILED DESCRIPTION OF PREFERRED EMBODIMENT(S)

A non-toxic formulation which has proven satisfactory for use with fish and game is comprised of various amounts of tungsten, tin and iron. It is preferred that these ingredients be mixed in quantities as follows: tungsten 40-60% by weight; tin 20-60% by weight; iron 0-10% by weight. While this formulation makes the iron component optional, a more preferred formula has a lower limit of 5%. This is to facilitate checking by the Fish and Game Commission, since magnetic formulaes are non-toxic or, stated more accurately, toxic (lead-containing) formulations are non-magnetic. The most preferred formulation comprises 38% by weight tin, 56% by weight tungsten and 6% by weight iron.

This formulation is made by the process of combining powdered tin, powdered tungsten and powdered iron, the particle size of each component having 95% by weight of particles being less than 325 mesh, together with a powdered flux of which 99.9% by weight has particles less than 100 mesh. A flux which has proven beneficial for this application is powdered ACRAWAX C available from Lanza Inc. of Fairlawn, N.J. (ACRAWAX is a registered trademark of Lanza Inc.) The purpose of the flux is to facilitate the proper blending of the metallic particles during sintering. The flux is added during the blending of the metallic particles in an amount ranging from 0.3-0.5% by weight of the metallic particles. The mixture is then compacted with pressures in the 20-40 ton per square inch range. The compaction formed material, is then sintered in a temperature range between 375 and 425° F. which bonds the metallic components and vaporizes the flux.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. Non-toxic shot for use with fish and game, said non-toxic shot consisting essentially of
   a) 20-60% by weight tin;
   b) 40-60% by weight tungsten; and
   c) 5-10% by weight iron.

2. The non-toxic formulation of claim 1 wherein the most preferred formulation comprises 38% by weight tin, 56% by weight tungsten and 6% by weight iron.

3. A method of making non-toxic shot comprising the steps of
   a) blending
      i) powdered tin,
      ii) powdered tungsten, and
      iii) powdered iron,
      95% by weight of all metallic particles having particle sizes less than 325 mesh;
      iv) powdered flux in which 99.9% by weight of the particles are less than 100 mesh;
   b) compaction forming the blended material into shape at a pressure range of between 20 and 40 tons per square inch;
   c) sintering the blended material at a temperature in the range of 350° F. and 425° F. bonding the powdered metals and driving off the flux.

4. Non-toxic shot for use with fish and game, said non-toxic shot consisting of
   a) 20-60% by weight tin;
   b) 40-60% by weight tungsten; and
   c) 5-10% by weight iron.

* * * * *